(12) United States Patent
Watanabe

(10) Patent No.: US 11,527,902 B2
(45) Date of Patent: Dec. 13, 2022

(54) ELECTRONIC DEVICE, PRINTING APPARATUS, AND METHOD FOR CONTROLLING ELECTRONIC DEVICE

(71) Applicant: CANON KABUSHIKI KAISHA, Tokyo (JP)

(72) Inventor: Tatsuro Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 17/159,896

(22) Filed: Jan. 27, 2021

(65) Prior Publication Data

US 2021/0242701 A1   Aug. 5, 2021

(30) Foreign Application Priority Data

Jan. 31, 2020 (JP) .............................. JP2020-015887

(51) Int. Cl.
*H02J 7/00* (2006.01)
*B41J 29/393* (2006.01)

(52) U.S. Cl.
CPC ........... *H02J 7/0068* (2013.01); *B41J 29/393* (2013.01); *H02J 7/0042* (2013.01)

(58) Field of Classification Search
CPC ..... H02J 7/0068; H02J 7/0042; H02J 2207/30
See application file for complete search history.

(56) References Cited

U.S. PATENT DOCUMENTS

| | | | | |
|---|---|---|---|---|
| 2011/0156659 A1* | 6/2011 | Saeki | ....................... | H02J 7/00 320/138 |
| 2013/0162198 A1* | 6/2013 | Yokota | .................. | H02J 7/0068 320/162 |
| 2015/0346794 A1* | 12/2015 | Sakashita | .............. | G06F 1/3287 713/310 |

FOREIGN PATENT DOCUMENTS

JP  2011-069318 A  4/2011

* cited by examiner

*Primary Examiner* — Daniel Kessie
*Assistant Examiner* — Brian K Baxter
(74) *Attorney, Agent, or Firm* — Canon U.S.A., Inc. IP Division

(57) ABSTRACT

An electronic device includes a control unit that allows at least a first external power source to be connected thereto and is activated upon receipt of a predetermined power, and a power source connected to the control unit. In an activated state, the control unit performs enumeration processing between the control unit and the first external power source. The power source has charging unit capable of being charged by a charge current supplied from the first external power source, and output unit that outputs the predetermined power from the charging unit to the control unit in response to a connection between the control unit and the first external power source. The charging unit sets the charge current to a current value according to whether the enumeration processing is completed.

19 Claims, 7 Drawing Sheets

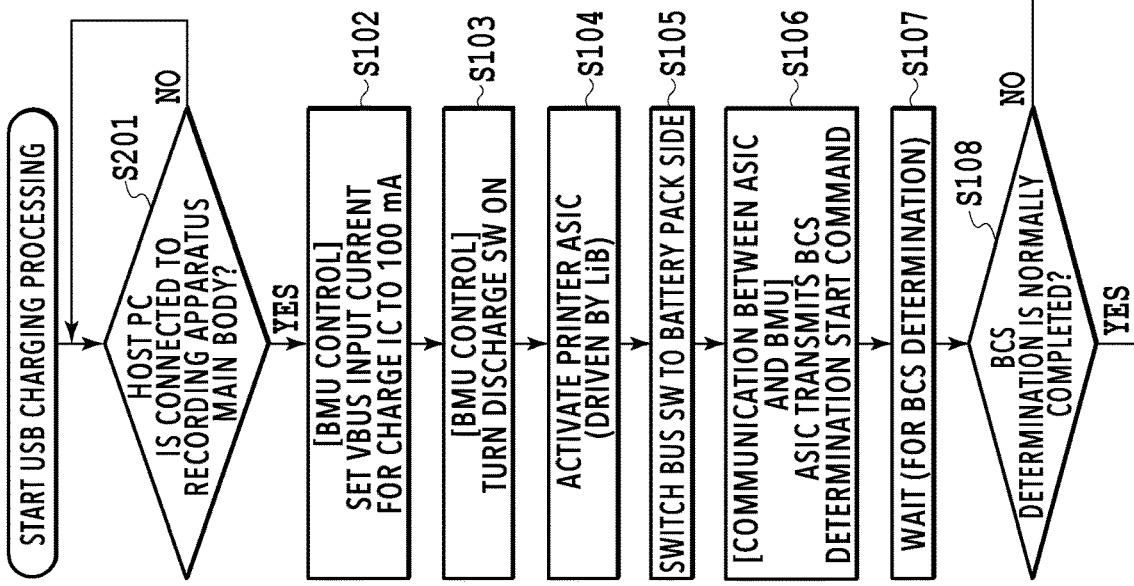

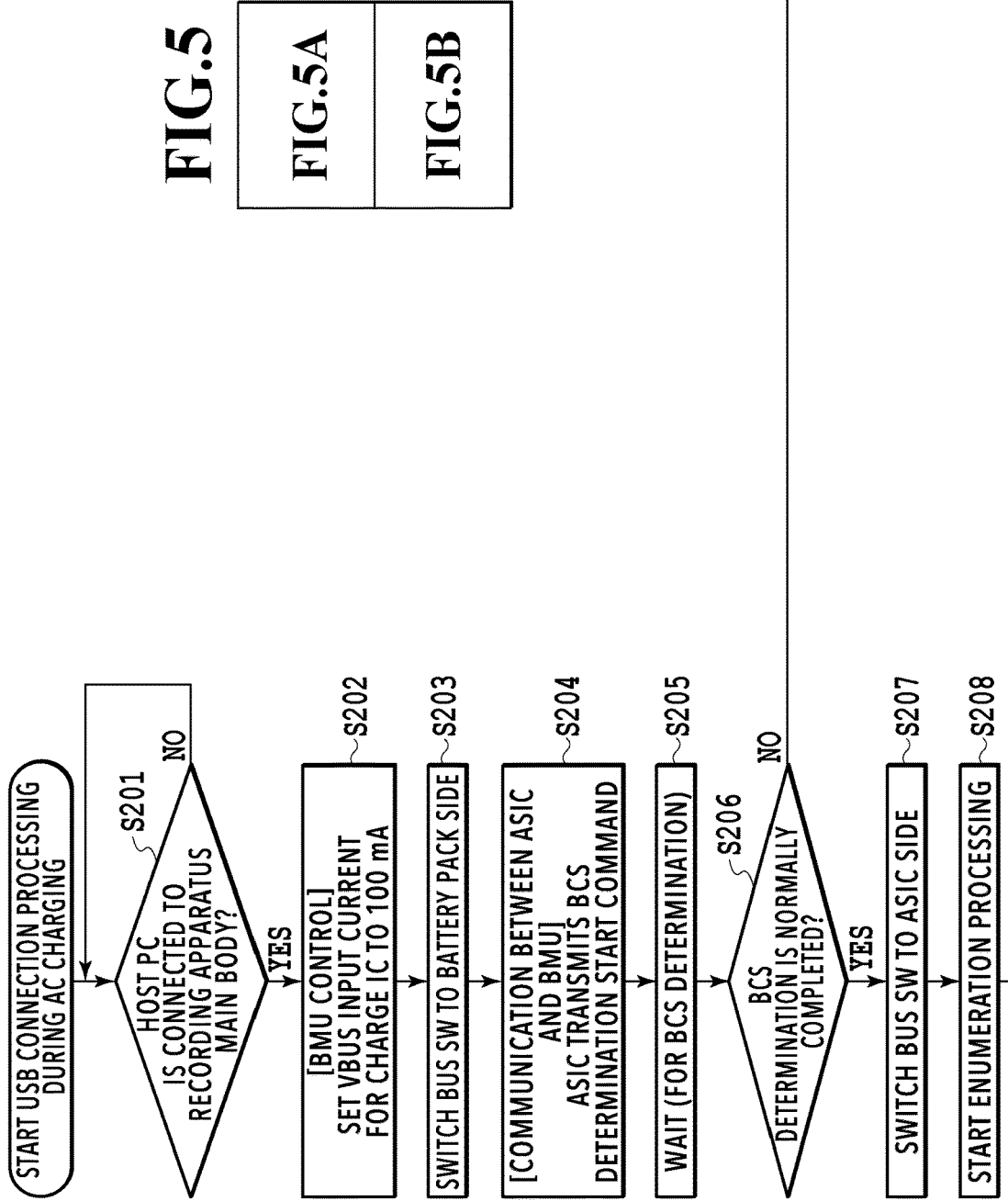

ELECTRONIC DEVICE, PRINTING APPARATUS, AND METHOD FOR CONTROLLING ELECTRONIC DEVICE

BACKGROUND OF THE DISCLOSURE

Field of the Disclosure

The aspect of the embodiments relates to an electronic device, a printing apparatus, and a method for controlling the electronic device.

Description of the Related Art

Devices that support Universal Serial Bus (USB) charging, which charges a battery (an auxiliary power source) using USB, have been increasing in recent years. In USB charging, enumeration processing may be executed between a power supply apparatus and an electronic device to be charged. A protocol for the USB 2.0 standard states that a power supply apparatus, at the time of being connected to an electronic device, can supply no more than 100 mA to the electronic device. According to this protocol, after the power supply apparatus brings the electronic device to a Configured state as a result of the enumeration processing executed upon a USB connection, the power that can be supplied by the power supply apparatus can be increased up to 500 mA.

Japanese Patent Laid-Open No. 2011-069318 (hereinafter referred to as Patent Literature 1) discloses a technique in which a battery is charged with a first power in a case where enumeration is completed, and is charged with a second power larger than the first power in a case where it is determined that enumeration is not completed. With this technique, a battery can be charged with a large power even in a case where enumeration is not completed.

However, the technique disclosed in Patent Literature 1 assumes a mode where a controller that performs the enumeration processing can be activated by a power that the power supply apparatus can supply through USB before the enumeration processing is performed. Thus, the technique disclosed in Patent Literature 1 cannot perform USB battery charging properly in a mode where a controller that performs the enumeration processing is not activated by a power that the power supply apparatus can supply through USB before the enumeration processing is performed.

SUMMARY OF THE DISCLOSURE

The aspect of the embodiments is an electronic device comprising: a control unit that allows at least a first external power source to be connected thereto and is activated upon receipt of a predetermined power; and a power source connected to the control unit. In an activated state, the control unit performs enumeration processing between the control unit and the first external power source. The power source includes a charging unit that is capable of being charged by a charge current supplied from the first external power source, and an output unit that outputs the predetermined power from the charging unit to the control unit in response to a connection between the control unit and the first external power source. The charging unit sets the charge current to a current value according to whether the enumeration processing is completed.

Further features of the disclosure will become apparent from the following description of exemplary embodiments with reference to the attached drawings.

BRIEF DESCRIPTION OF THE DRAWINGS

FIG. 4 is a diagram showing a relationship of FIGS. 4A and 4B;

FIGS. 4A and 4B are flowcharts showing USB charging processing;

FIG. 5 is a diagram showing a relationship of FIGS. 5A and 5B; and

FIGS. 5A and 5B are flowcharts showing USB connection processing during AC charging.

DESCRIPTION OF THE EMBODIMENTS

With reference to the drawings, a detailed description is given of an electronic device according to an embodiment of the present disclosure. As an example of the electronic device, the present embodiment describes an inkjet printing apparatus that performs printing operations by ejecting ink. However, the electronic device is not limited to the above-described form, and may be any apparatus that can be supplied with power through a USB cable. Specifically, for example, the electronic device may be a printing apparatus that performs printing operations using a method other than the inkjet method. The electronic device may also be an apparatus other than a printing apparatus (such as a personal computer, a smartphone, a scanner, a digital camera, or a smart speaker). Further, the following embodiment is not intended to limit the present disclosure according to the scope of claims, and not all the features and their combinations described in the present embodiment are essential to the solving unit of the present disclosure.

Figure 1:
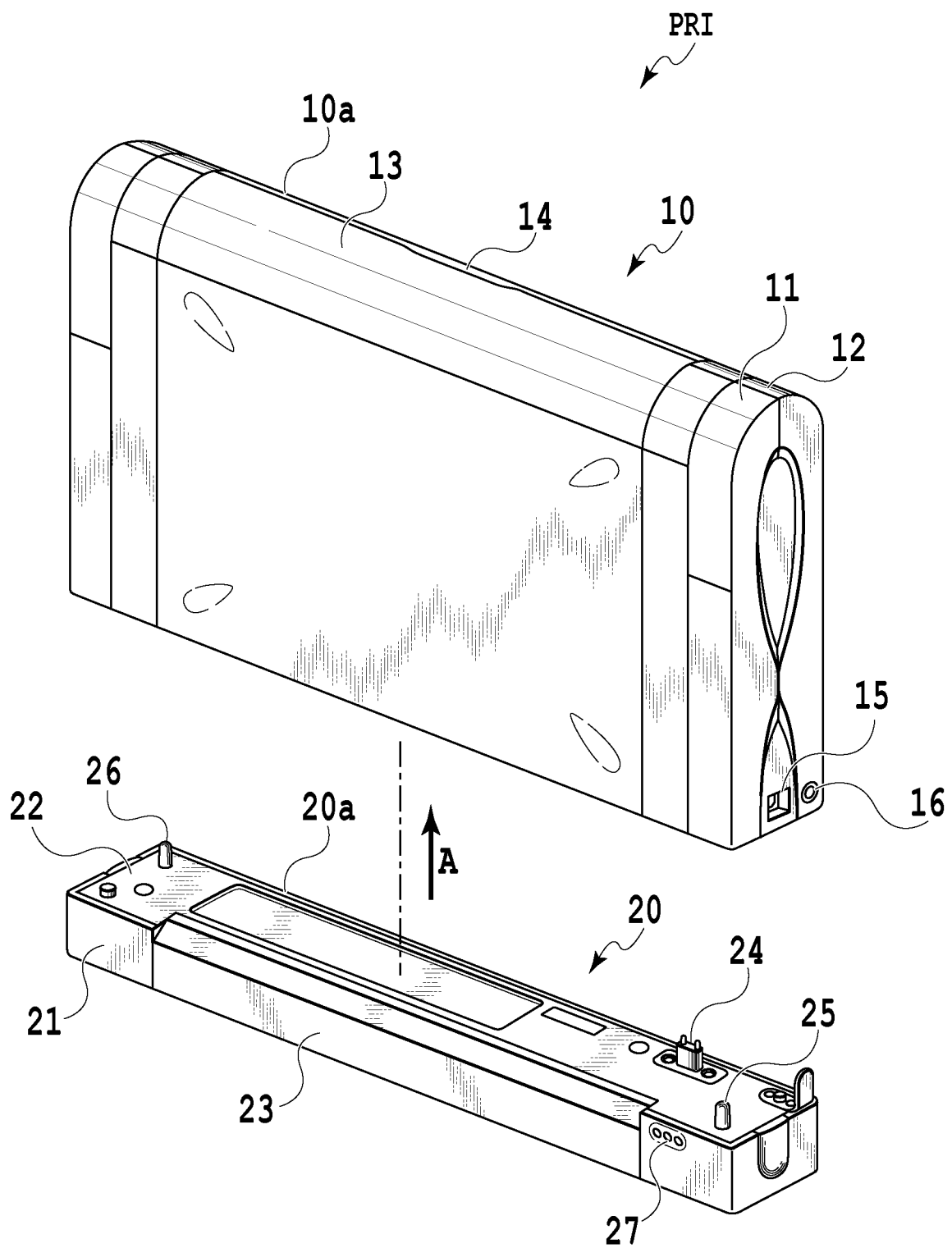
FIG. 1 is a perspective view of the outer appearance of an electronic device according to an embodiment of the present disclosure.

FIG. 1 is a perspective view of the outer appearance of a printing apparatus PRI of the present embodiment. The printing apparatus PRI has a printing apparatus main body 10 and a battery module 20 that is attachable to and detachable from the printing apparatus main body 10.

The printing apparatus main body 10 has a casing part 10a which forms the outer shell of the printing apparatus main body 10 and which is formed by an upper case 11, a lower case 12, a paper feed cover 13, and a paper discharge cover 14. The casing part 10a houses a drive mechanism (FIG. 2) to be described later. FIG. 1 shows the printing apparatus PRI not in use (such as being placed on a desk or being carried). While the printing apparatus PRI is in use, the paper feed cover 13 is opened to the back and serves as a feed tray for placing a print sheet.

The printing apparatus main body 10 is provided with, on its side surface, an interface (I/F) connector 15 and a direct-current input jack (DC-in jack) 16. The interface (I/F) connector 15 is where a Universal Serial Bus (USB) cable is to be connected. The direct-current input jack (DC-in jack) 16 is where an AC adapter cable (not shown) used to receive a power supply from an AC power source is to be inserted.

The battery module 20 has a casing part 20a which forms the outer shell of the battery module 20 and which is formed by a main case 21, a cover case 22, and a battery lid 23. The casing part 20a houses a battery pack 54 (FIG. 3) incorporating a lithium-ion battery. Removing the battery lid 23 and thereby opening the main case 21 allows the battery pack 54 to be taken off from the casing part 20a. The battery module 20 is also provided with, on its surface to be attached to the printing apparatus main body 10 (a connection surface), a main body connector 24 for electrically connecting the battery module 20 to the printing apparatus main body 10 and fixation screws 25, 26 for mechanically fixing the battery module 20 to the printing apparatus main body 10.

Attaching the battery module 20 to the printing apparatus main body 10 in a direction denoted by arrow A in FIG. 1 causes the main body connector 24 to be electrically connected to the printing apparatus main body 10. Connecting an AC adapter 53 (FIG. 3) to the DC-in jack 16 in this state enables AC charging, where the battery pack 54 is charged with the AC adapter 53 serving as a power source. The AC adapter 53 is an apparatus that converts alternate-current power supplied from a commercial power source outside the printing apparatus main body 10 into direct-current power, and supplies the thus-converted direct-current power to the printing apparatus main body 10. In a state where the AC adapter 53 is connected to the printing apparatus main body 10 via connectors such as an outlet and a plug, power is supplied from the AC adapter 53 to the printing apparatus main body 10. While the AC adapter 53 is connected to the printing apparatus main body 10, the printing apparatus main body 10 is driven not by the power supplied from the battery pack 54, but by the power supplied from the AC adapter 53. While the AC adapter 53 is connected to the printing apparatus main body 10 with the printing apparatus main body 10 being in a hard-off state, the battery pack 54 is charged by the power supplied from the AC adapter 53. In the present embodiment, the AC adapter 53 is connected to the printing apparatus main body 10 through an interface other than USB. Thus, the printing apparatus main body 10 can be supplied with sufficiently large power from the AC adapter 53 without executing enumeration processing based on the USB standard.

In the present embodiment, connecting a power supply apparatus and the I/F connector 15 via a USB cable enables USB charging, where the battery pack 54 is charged by the power supply apparatus via a USB bus. After the battery pack 54 is charged up, the printing apparatus PRI can be driven by the power supplied from the battery even without a power supply from the outside. The top surface of the battery module 20 is provided with a charge display unit 27 to indicate the charging status of the battery. The power supply apparatus is, for example, an apparatus serving as an external power source, and may be a host personal computer (PC) or a mobile battery. In a case where a host PC and the printing apparatus main body 10 are connected to each other via a USB cable, enumeration processing based on the USB standard may be executed. The enumeration processing is a series of data communications performed in order for the operating system (OS) of the host PC to recognize the apparatus USB-connected thereto (the printing apparatus main body 10 here). Once the enumeration processing is completed, the OS of the host PC can recognize various pieces of information in the apparatus USB-connected thereto. In a case where the host PC and the printing apparatus main body 10 are connected via a USB cable, not only charging via the USB cable, but also data communications (such as print data communications) via the USB cable are possible between the host PC and the printing apparatus main body 10. In other words, in the present embodiment, in a state where the printing apparatus main body 10 is in a soft-on state, the printing apparatus main body 10 can receive print data from the host PC via a USB cable and execute printing based on the received print data.

Figure 2:
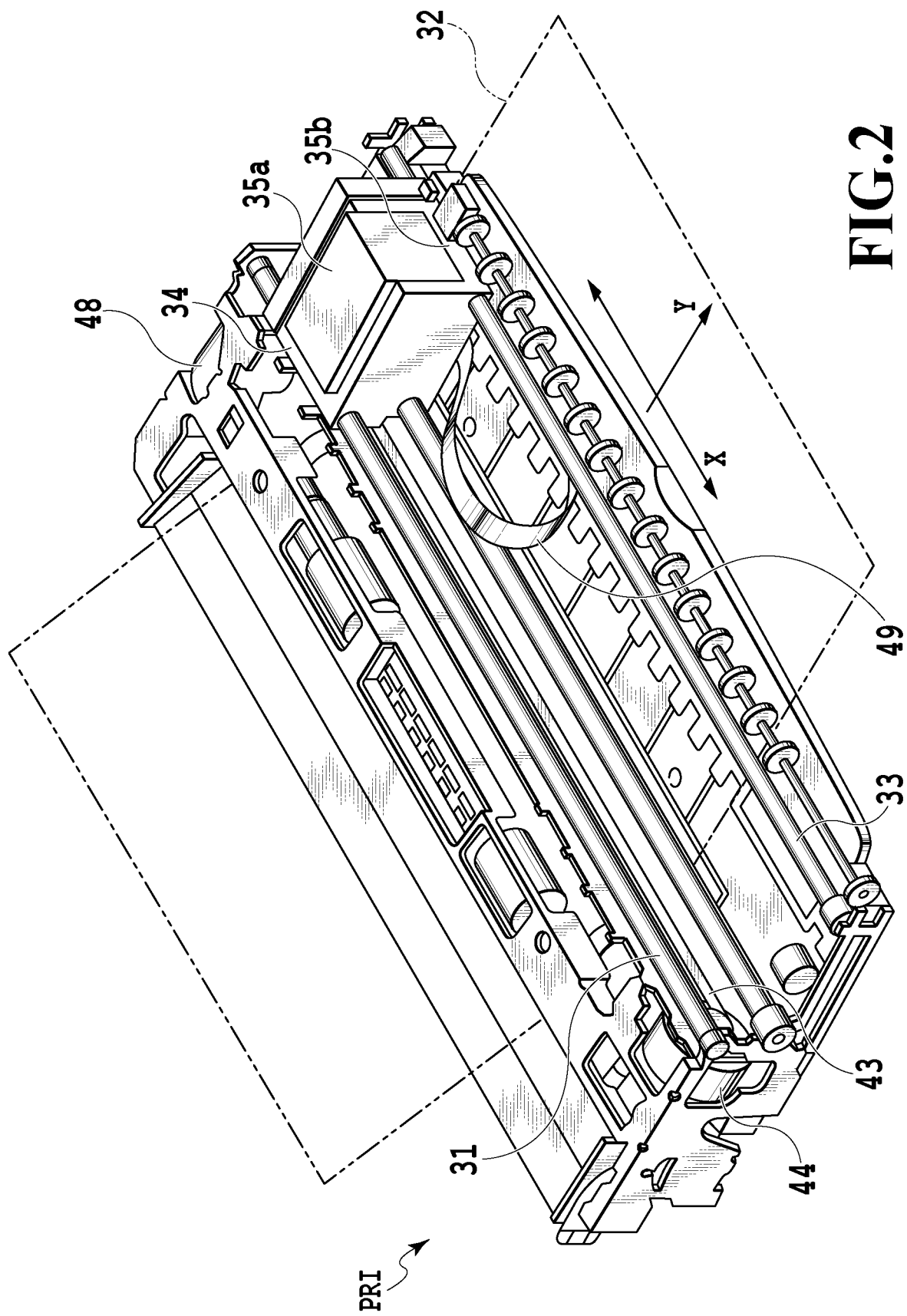
FIG. 2 is a perspective view illustrating the internal structure of the electronic device shown in FIG. 1.

FIG. 2 is a perspective view showing the drive mechanism of the printing apparatus PRI. The printing apparatus PRI has a conveyance roller 31, a guide rail 33, a carriage 34, an ink tank 35a, a printing head (printing unit) 35b, a carriage belt 43, a carriage motor 44, a conveyance motor 48, and a flexible cable 49. The printing head 35b is mounted on the carriage 34 and is capable of moving back and forth along the guide rail 33 in a main scanning direction (X direction). The printing head 35b is supplied with ejection data via the flexible cable 49, the ejection data being generated based on input image data and indicating ejection or non-ejection of ink. The printing head 35b ejects ink based on this ejection data. Ejected ink lands on a print medium 32 supported with a minute space from the printing head 35b, thereby printing an image on the print medium 32.

The carriage motor 44 is a motor for causing the carriage 34 to scan along the guide rail 33. The drive force of the carriage motor 44 is transmitted to the carriage 34 via the carriage belt 43. The conveyance motor 48 is a motor for rotating the conveyance roller 31 to move the print medium 32 in a direction (Y direction) intersecting with the main scanning direction. This conveyance motor 48 and the conveyance roller 31 constitute conveyance unit (moving unit) that conveys a print medium. The printing apparatus of the present embodiment is thus a serial-type printing apparatus which performs printing by moving the ink-ejecting printing head 35b back and forth in the main scanning direction, while intermittently conveying a print medium in the Y direction.

In the present embodiment, the printing head 35b is coupled with the ink tank 35a, together forming a head cartridge. This head cartridge may be configured so that the printing head 35b and the ink tank 35a are separable or integral.

Figure 3:
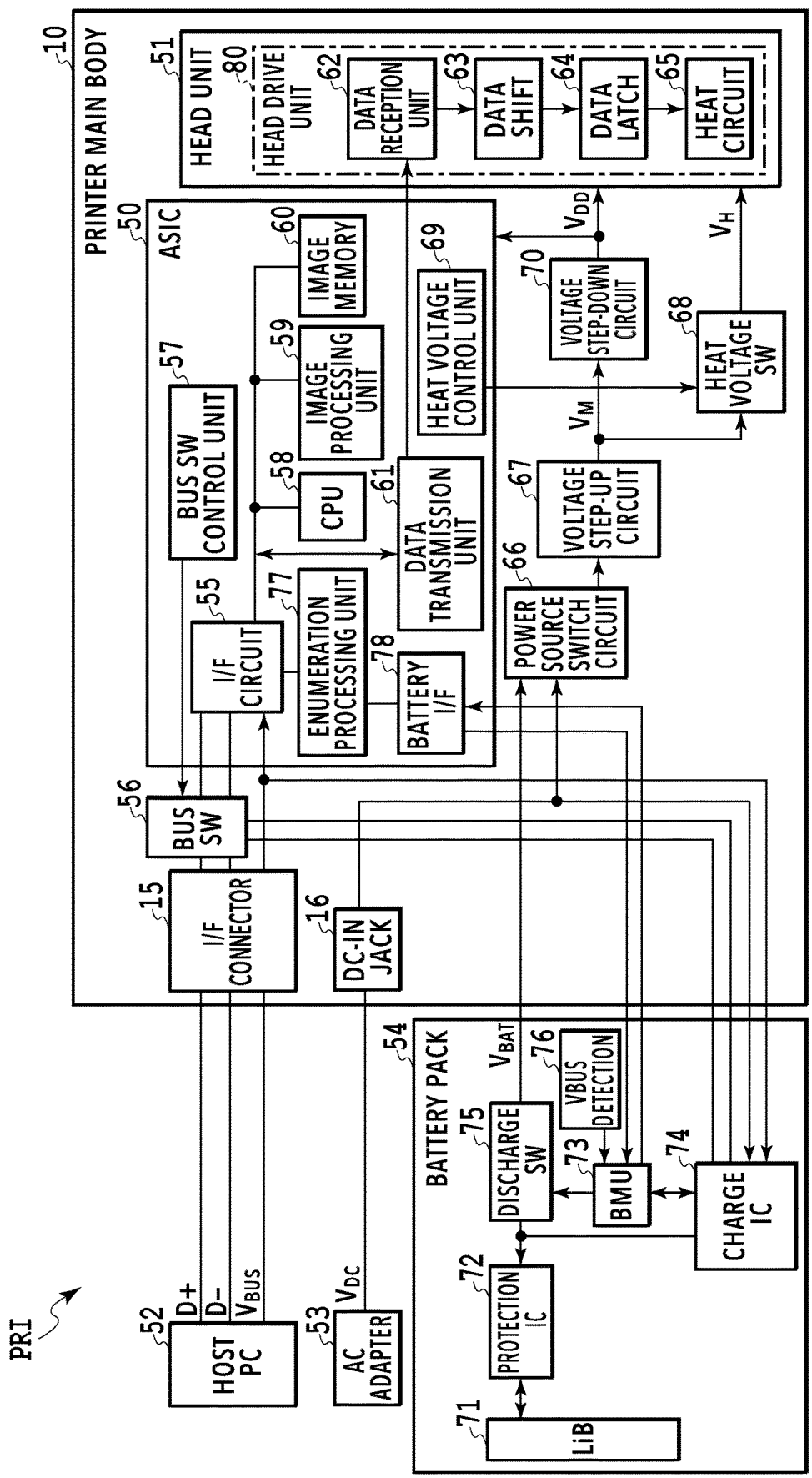
FIG. 3 is a block diagram showing the control configuration of the electronic device.

FIG. 3 is a block diagram showing the control configuration of the printing apparatus PRI. The printing apparatus main body 10 is provided with an application-specific integrated circuit (ASIC) 50 as a control unit that controls the printing apparatus PRI, a head unit 51, a power source switch circuit 66, a voltage step-up circuit 67, a heat voltage switch (SW) 68, a voltage step-down circuit 70, and a bus SW 56. In the present embodiment, the ASIC 50 (or a central processing unit (CPU) 58 incorporated in the ASIC 50) is the controller that executes enumeration processing. The printing apparatus main body 10 is also provided with the I/F connector 15 and the DC-in jack 16 described earlier. The I/F connector 15 allows the printing apparatus main body 10 to be connected to a power supply apparatus (a host PC 52 in this example) which is a first external power source, and the DC-in jack 16 allows the printing apparatus main body 10 to be removably connected to the AC adapter 53 which is a second external power source.

The host PC 52 transmits image data on an image to be printed by the printing apparatus main body 10 and various control commands to the printing apparatus main body 10 via a USB cable. Control commands and printing data transmitted from the host PC 52 are received by an interface (I/F) circuit 55 provided to the ASIC 50, via the I/F connector 15 and the bus SW 56. The bus SW 56 is controlled by a bus SW control unit 57, and is configured so that the D+ and D− pins of the host PC 52 can be selectively connected to either one of the ASIC 50 and the battery pack 54, which is an auxiliary power source.

A control command received by the interface (I/F) circuit 55 is analyzed by the CPU 58, and the printing apparatus PRI is controlled according to the control command. Printing data received by the interface (I/F) circuit 55 is sent to an image processing unit 59. The image processing unit 59 performs image processing according to a printing method to be executed from among various printing methods, and data obtained by the image processing is stored in an image memory 60 as ejection data indicating ejection and non-ejection of ink. The stored ejection data is read from the image memory 60 at the time of printing.

A data transmission unit 61 provided to the ASIC 50 transmits printing data read from the image memory 60 to the head unit 51. The ASIC 50 is equipped with an enumeration processing unit 77 to perform enumeration processing between the host PC 52 and the printing apparatus main body 10 in the event where the host PC 52 is connected to the printing apparatus main body 10. A result of the processing performed by the enumeration processing unit 77 is communicated via a battery interface (I/F) 78 to a battery management unit (BMU) 73 to be described later provided to the battery pack 54. A heat voltage control unit 69 incorporated in the ASIC 50 outputs an instruction controlling ON and OFF of the heat voltage SW 68. In the present embodiment, the CPU 58 that controls the ASIC 50 is included in the ASIC 50. Thus, in the following description of the present embodiment, processing executed by the ASIC 50 is executed by the CPU 58 controlling the ASIC 50.

The head unit 51 is formed by the printing head 35b and the ink tank 35a described earlier, and a head drive unit 80 that drives the printing head 35b. After a data reception unit 62 receives ejection data transmitted from the data transmission unit 61, the head drive unit 70 inputs the ejection data to a shift register 63. The shift register 63 outputs the ejection data to a data latch 64 as serial data. The data latch 64 temporarily stores the ejection data outputted from the shift register 63, then converts the ejection data to parallel data, and outputs the parallel data to a heat circuit 65. The heat circuit 65 receives ejection data outputted from the data latch 64 and heat pulse width information corresponding to a period of time for heating the ejection energy producing elements (heaters) of the printing head, selectively drives the ejection energy producing elements based on the information received, and thereby causes ink to be ejected.

The printing apparatus main body 10 is capable of being driven by an output voltage $V_{DC}$ from the AC adapter 53 and being driven by an output voltage $V_{BAT}$ from the battery pack 54. The output voltage $V_{DC}$ and the output voltage $V_{BAT}$ used for driving the printing apparatus main body 10 are selectively switched by the power source switch circuit 66. In the present embodiment, in a case where both of the AC adapter 53 and the battery pack 54 are connected to the printing apparatus main body 10, the power source switch circuit 66 is controlled so that the printing apparatus may be driven by the output voltage $V_{DC}$ from the AC adapter 53. A voltage outputted from the power source switch circuit 66 is stepped up by the voltage step-up circuit 67 to a voltage (heat voltage $V_H$) used to heat the heaters (ejection energy producing elements) of the printing head. The heat voltage SW 68 carries or cuts (switches ON/OFF) a supply of the heat voltage $V_H$ to the heat circuit 65. This ON/OFF control of the heat voltage SW 68 is performed as instructed by the heat voltage control unit 69 incorporated in the ASIC 50. The voltage step-down circuit 70 steps down a voltage $V_M$ outputted from the voltage step-up circuit 67 and generates a logic power source voltage $V_{DD}$ to be used in the ASIC 50 or the head unit 51.

The battery pack 54 has a lithium-ion battery (LiB) 71 which serves as a power source, a protection IC 72, the BMU 73, a charge IC 74, a discharge SW 75, and a VBUS detection circuit 76. The protection IC 72 is an IC with a function of protecting the LiB 71 from abnormal operations such as overdischarge, overcharge, and overcurrent. The BMU 73 is a unit for controlling mainly discharging and charging of the LiB 71, and is a processor incorporated in the battery pack 54. The LiB 71, the BMU 73, the discharge SW 75, and the VBUS detection circuit 76 constitute output unit that outputs a predetermined power from the above-described charging unit including the charge IC 74 and LiB 71 to the ASIC 50 in response to a connection between a power supply apparatus and the ASIC 50.

The BMU 73 communicates with the ASIC 50 via a battery I/F (communication unit) 78 incorporated in the ASIC 50, and controls discharging and charging of the LiB 71 as commanded by the ASIC 50. In the present embodiment, communications between the BMU 73 and the ASIC 50 are carried out using the universal asynchronous receiver-transmitter (UART) scheme.

As instructed by the BMU 73, the charge IC 74 performs control such as control of a charge current for the LiB 71 and control of ON/OFF of charging, and is capable of charging the LiB 71 using both the output voltage $V_{DC}$ from the AC adapter 53 and a voltage $V_{BUS}$ from the power supply apparatus through USB as a power source. The charge IC 74 is connected to the D+ and D− pins via the bus SW 56, and in the event of USB charging, determines a charge current suitable for the power supply apparatus supplying power or the USB device. In the present embodiment, the determination conforms to the USB Battery Charging (USB-BC) specification (hereinafter, this determination is referred to as BCS determination).

The BCS determination is processing for determining which protocol is used for the USB connection between the power supply apparatus and the printing apparatus main body 10. For example, there are three types of protocols used for the USB connection between the power supply apparatus and the printing apparatus main body 10: Standard Downstream Port (SDP), Charging Downstream Port (CDP), and Dedicated Charging Port (DCP).

SDP is a protocol used in a case where a USB connection is made between the host PC 52 and the printing apparatus main body 10 via a port other than the charging port on the host PC 52. In a case where SDP is used, a supply of power equivalent to 100 mA is permitted to the printing apparatus main body 10 until the enumeration processing is completed between the host PC 52 and the printing apparatus main body 10. Once the enumeration processing is completed, a supply of power larger than 100 mA (for example, 500 mA) is permitted to the printing apparatus main body 10.

CDP is a protocol used in a case where a USB connection is made between the host PC 52 and the printing apparatus main body 10 via the charging port on the host PC 52. In a case where CDP is used, a supply of power equivalent to a sufficiently large current (for example, 1.5 A) is permitted before the enumeration processing is completed between the host PC 52 and the printing apparatus main body 10.

DCP is a protocol used in a case where a USB connection is made between a charging apparatus, such as a mobile battery, and the printing apparatus main body 10. In a case where DCP is used, the enumeration processing does not have to be performed between the mobile battery and the printing apparatus main body 10. In other words, without the enumeration processing being performed, a supply of power equivalent to a sufficiently large current (for example 1.5 A) is permitted. Thus, in the present embodiment, the following control is performed. In a case where a result of the BCS determination is SDP, charging with a charge current of 500 mA is permitted after the enumeration processing is completed, and in a case where a result of the BCS determination is CDP or DCP, charging with a charge current of 1.5 A is permitted. In the present embodiment, the ASIC 50, which is the controller that performs enumeration processing, cannot be activated by power equivalent to 100 mA, but can be activated by power equivalent to a current sufficiently larger than 100 mA (for example, 500 mA).

The timing of the BCS determination can be controlled by the ASIC 50 via the battery I/F 78. A result of the BCS determination is transmitted to the ASIC 50 via the BMU 73 and the battery I/F 78. The discharge SW 75 is a switch to turn on and off the voltage from the LiB 71, and is controlled by the BMU 73. The VBUS detection circuit 76 is a circuit for detecting a connection of a host PC 52 or a USB device to the I/F connector 15 of the printing apparatus main body 10, and a result of the detection is transmitted to the BMU 73. The ASIC 50 is equipped with the enumeration processing unit 77 which, in the event where the host PC 52 is connected, performs enumeration processing between the printing apparatus main body 10 and the host PC 52. Information indicating completion of the enumeration processing is communicated to the BMU 73 via the battery I/F 78. In the present embodiment, the BMU 73 sets a charge current for the charge IC 74 based on information indicative of completion of enumeration processing and information indicative of a BCS determination result.

Figure 4B:
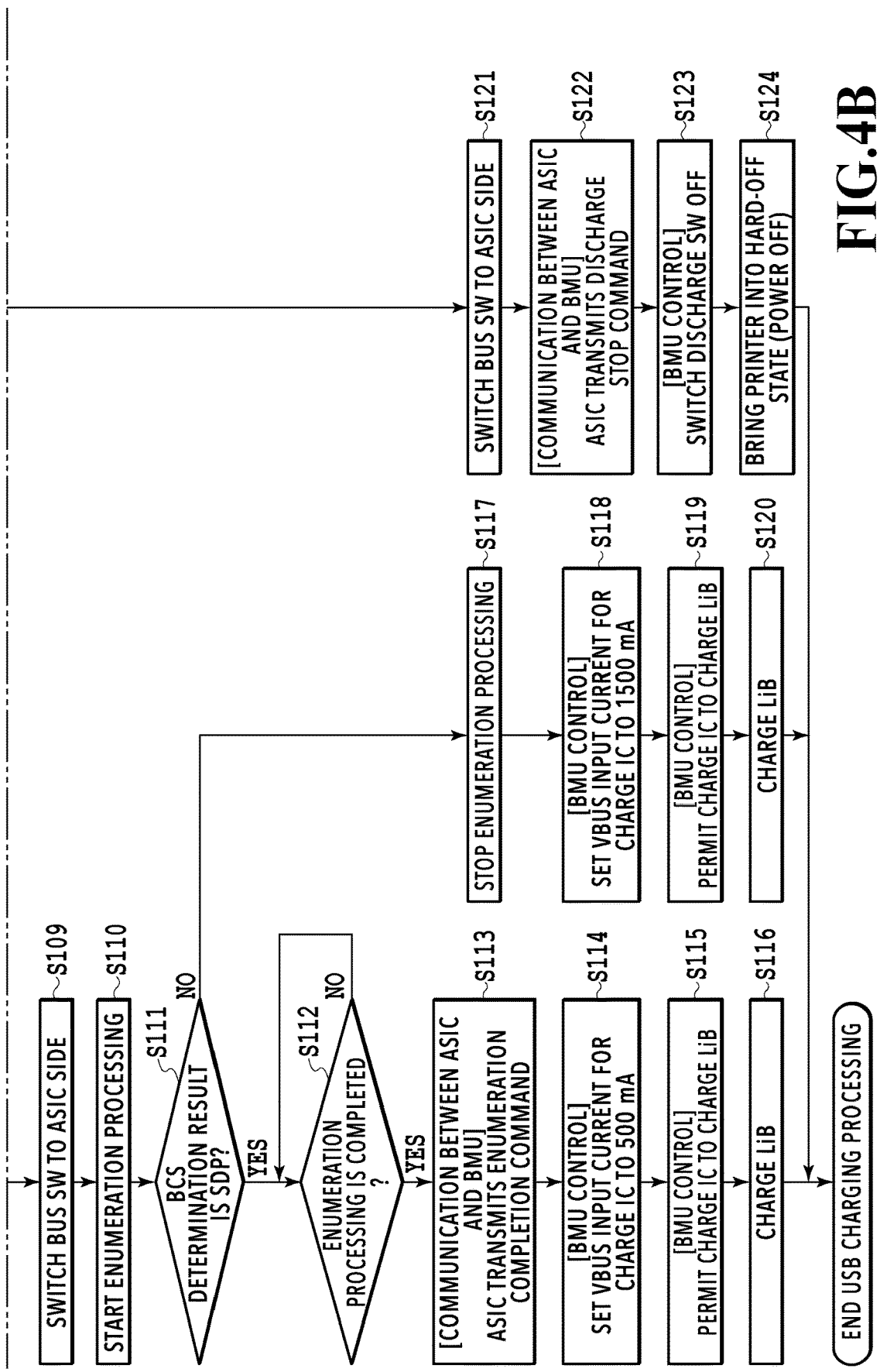

Next, a description is given of processing for charging the battery pack 54 connected to the printing apparatus main body 10. First, using the flowchart in FIGS. 4A and 4B, a description is given of USB charging processing in which the battery pack 54 connected to the printing apparatus main body 10 is charged by power supplied from the printing apparatus main body 10. The power modes of the printing apparatus main body 10 include a hard-off state and a soft-on state, and are switched by a press on a power button on the printing apparatus main body 10. In the hard-off state, no power is supplied to the head unit 51 and the like, and printing operations cannot be executed. In the soft-on state, power is supplied to the head unit 51 and the like, and printing operations can be executed in response to a print instruction. In the flowchart shown in FIGS. 4A and 4B, the printing apparatus main body 10 is in the hard-off state, and the AC adapter 53 is not connected to the printing apparatus main body 10. In the flowcharts in FIGS. 4A and 4B and FIGS. 5A and 5B referred to herein, letter "S" accompanying each step number denotes Step.

In S101, it is determined whether a power supply apparatus is connected to the printing apparatus main body 10 which is in the hard-off state, with a USB cable. This determination is performed by the BMU 73 based on an output from the VBUS detection circuit 76 that detects a connection of a power supply apparatus to the printing apparatus main body 10. The BMU 73 is supplied with power remaining in the LiB 71. In a case where it is determined in S101 that a power supply apparatus is connected to the printing apparatus main body 10 with a USB cable, charging processing shown from S102 onward is started.

In S102, the BMU 73 sets a $V_{BUS}$ input current for the charge IC 74 to 100 mA. However, with the power of 100 mA, the ASIC 50 in the printing apparatus PRI cannot be activated. Thus, the BMU 73 turns on the discharge SW 75 in S103, and supplies a predetermined power from the LiB 71 to the printing apparatus main body 10 via the discharge SW 75. Thus, it is assumed here that at least enough power to activate the ASIC 50 is accumulated in the LiB 71 beforehand. It is also assumed here that power supplied at this time is equivalent to a current sufficiently larger than 100 mA. The predetermined power supplied from the LiB 71 is supplied to the ASIC 50 via the power source switch circuit 66, the voltage step-up circuit 67, and the voltage step-down circuit 70, thereby activating the ASIC 50 (S104).

Then, in S105, the bus SW control unit 57 of the ASIC 50 switches the bus SW 56 to the battery pack 54 side. Then in S106, the ASIC 50 transmits a command for starting the BCS determination (hereinafter referred to as a BCS command) to the BMU 73 via the battery I/F 78. In response to the determination start command, the BMU 73 starts the BCS determination. Meanwhile, the ASIC 50 performs wait operation to wait for a BCS determination result from the BMU 73 (S107), and then, determines whether the BCS determination has been completed normally (S108). In a case where it is determined that the BMU 73 has completed the BCS determination normally, the bus SW control unit 57 switches the bus SW 56 to the ASIC 50 side (S109), enabling communications between the host PC 52 and the ASIC 50. In this state, the enumeration processing unit (enumeration processing unit) 77 of the ASIC 50 executes processing for starting the enumeration processing between the power supply apparatus and the printing apparatus main body 10 (S110), and then the flowchart proceeds to S111. In a case where the protocol of a USB connection with the power supply apparatus is DCP, the enumeration processing is not actually started even after the processing in S110 is executed. The enumeration processing is actually started in a case where the protocol for a USB connection with the power supply apparatus is SDP or CDP.

In S111, it is determined whether the result of the BCS determination conducted by the BMU 73 is SDP or other than SDP (i.e., DCP or CDP), and the determination result is transmitted to the ASIC 50. The determination result transmitted to the ASIC 50 is inputted to the CPU 58 via the battery I/F 78, the enumeration processing unit 77, and the I/F circuit 55. In the case where the result of the BCS determination in S111 is SDP, the ASIC 50 determines whether the enumeration processing performed between the enumeration processing unit 77 and the host PC 52 has been completed (S112). After determining that the enumeration processing has been completed, the ASIC 50 transmits an enumeration completion command to the BMU 73 via the battery I/F 78 (S113).

Upon receipt of the enumeration completion command, the BMU 73 changes the setting of the $V_{BUS}$ input current for the charge IC 74 from 100 mA to 500 mA (S114). Then, the BMU 73 issues a charge permission notification to the charge IC 74 (S115). Thereby, the BMU 73 starts causing the charge IC 74 to charge the LiB 71 using the charge current of 500 mA (S116), and the charging ends once the LiB 71 is charged to a predetermined amount of power.

Meanwhile, in a case where the result of the BCS determination in S111 is other than SDP, in other words, is DCP or CDP, the ASIC 50 receiving this determination result transmits a command to stop the enumeration processing being performed by the enumeration processing unit 77. Thereby, the enumeration processing unit 77 stops the enumeration processing (S117), and also, an enumeration stop command is transmitted to the BMU 73 via the battery I/F 78. As described earlier, the enumeration processing is to be executed even in a case where the protocol of a USB connection with the power supply apparatus is CDP, in order for the power supply apparatus to recognize the printing apparatus PRI. Thus, also in a case where the protocol of a USB connection with the power supply apparatus is CDP, the enumeration processing is completed by a sequence other than the charging sequence shown in FIGS. 4A and 4B. Upon receipt of the enumeration stop command, the BMU 73 changes the setting of the $V_{BUS}$ input current for the charge IC 74 from 100 mA to 1500 mA (S118). Then, the BMU 73 issues a charge permission notification to the charge IC 74 (S119). Thereby, the BMU 73 starts causing the charge IC 74 to charge the LiB 71 using a charge current of 1500 mA (S120), and the charging ends once the LiB 71 is charged to a predetermined amount of power.

In a case where it is determined in S110 that the BCS determination has not completed normally, this determination result is transmitted from the BMU 73 to the ASIC 50, and the ASIC 50 receiving this determination result performs processing for stopping charging. In other words, upon receipt of the determination result, the bus SW control unit 57 of the ASIC 50 switches the bus SW 56 to the ASIC 50 side (S121). Thereafter, the CPU 58 transmits a discharge stop command for switching off the discharge SW 75 to the BMU 73 via the battery I/F 78 (S122). Upon receipt of the discharge stop command, the BMU 73 switches the discharge SW 75 off (S123), and cuts a supply of power from the LiB 71 to the ASIC 50. Thereafter, the CPU 58 brings the printing apparatus to the hard-off state (S124).

The above describes a mode where the BCS determination result is referred to (S111) after the ASIC 50 is activated by the power supplied from the LiB 71 in S104. Alternatively, for example, the BCS determination result may be referred to before the ASIC 50 is activated, and the ASIC 50 may be activated using power supplied from the LiB 71 in a case where the determination result indicates SDP, or may be activated using power supplied directly through USB (1500 mA) in a case where the determination result indicates other than SDP. The same relations between the processing steps apply to the flowchart in FIGS. 5A and 5B to be described later.

Also, the above describes a mode where the BCS determination result is referred to (S111) after the enumeration processing is started in S110. Alternatively, for example, the BCS determination result may be referred to before the enumeration processing is started, and the enumeration processing may be started in a case where the determination result is SDP, or may be not started in a case where the determination result is other than SDP. The same relations between the processing steps apply to the flowchart in FIGS. 5A and 5B to be described later.

Figure 5B:
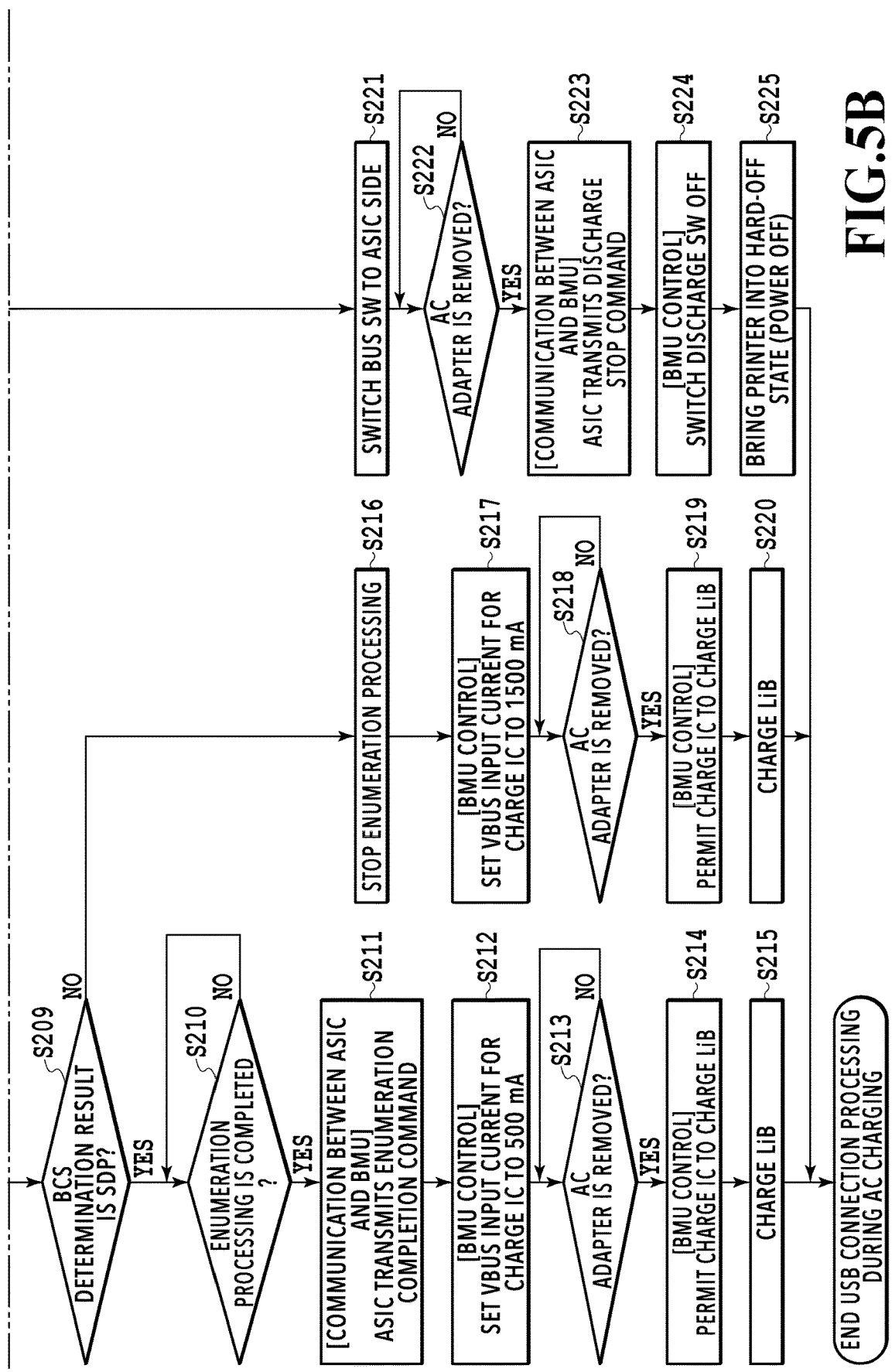

Next, using the flowchart shown in FIGS. 5A and 5B, a description is given of USB connection processing performed during AC charging. In this processing, a transition is made from AC charging to USB charging in response to removal of the AC adapter 53 connected to the host PC 52 after a USB connection is made during AC charging. It is assumed that at the time the flowchart shown in FIGS. 5A and 5B starts, the ASIC 50 has already been activated by power supplied from the AC adapter 53 or by power supplied from the LiB 71 charged by the power supplied from the AC adapter 53.

In S201, it is determined whether a power supply apparatus is connected to the printing apparatus main body 10 which is in the hard-off state, with a USB cable. Like in S101 in FIGS. 4A and 4B, this determination is performed by the BMU 73 based on an output from the VBUS detection circuit 76. In a case where it is determined in S201 that a power supply apparatus is connected to the printing apparatus main body 10 with a USB cable, the flowchart proceeds to S202. In S202, the BMU 73 sets the $V_{BUS}$ input current for the charge IC 74 to 100 mA.

Next, in S203, the ASIC 50 causes the bus SW control unit 57 to switch the bus SW 56 to the battery pack 54 side. Then, the ASIC 50 transmits a command for starting the BCS determination (a BCS command) to the BMU 73 (S204).

Next, the ASIC 50 performs wait operation to wait for a result of the BCS determination from the BMU 73 (S205), and then determines whether the BCS determination has been completed normally (S206). In a case where the BMU 73 has completed the BCS determination normally, the flowchart proceeds to S207, where the bus SW control unit 57 switches the bus SW 56 to the ASIC 50 side. Thereafter, processing for starting enumeration processing is executed in S208, and the flowchart proceeds to S209.

In S209, it is determined whether the result of the BCS determination performed by the BMU 73 is SDP or other than SDP (i.e., DCP or CDP), and a result of this determination is transmitted to the ASIC 50. Then, the ASIC 50 determines whether the enumeration processing has been completed (S210), and in a case where the enumeration processing has been completed, transmits an enumeration completion command to the BMU 73 (S211). Upon receipt of the enumeration completion command, the BMU 73 changes the setting of the $V_{BUS}$ input current for the charge IC 74 from 100 mA to 500 mA (S212).

Then, the BMU 73 determines whether the AC adapter 53 has been removed from the printing apparatus main body 10 (S213), and stops AC charging in a case where the AC adapter 53 has been removed, and the flowchart proceeds to S214. In S214, the BMU 73 issues a charge permission notification to the charge IC 74, thereby causing the charge IC 74 to start charging the LiB 71 using a charge current of 500 mA (S215). Then, the charging ends once the LiB 71 is charged to a predetermined amount of power.

Meanwhile, in a case where the BCS determination in S210 determines that the protocol is other than SDP, or in other words, is DCP or CDP, the ASIC 50 transmits a command for stopping the enumeration processing being performed by the enumeration processing unit 77. Thereby, the enumeration processing unit 77 stops the enumeration processing (S216), and also, an enumeration stop command is transmitted to the BMU 73 via the battery I/F 78. Upon receipt of the enumeration stop command, the BMU 73 changes the setting of the $V_{BUS}$ input current for the charge IC 74 from 100 mA to 1500 mA (S217). Then, the BMU 73 determines whether the AC adapter 53 has been removed from the printing apparatus main body 10 (S218), and the flowchart proceeds to S219 in a case where the AC adapter 53 has been removed. In S219, the BMU 73 issues a charge permission notification, thereby causing the charge IC 74 to start charging the LiB 71 using a charge current of 1500 mA (S220).

In a case where it is determined in S210 that the BCS determination has not been completed normally, the bus SW control unit 57 of the ASIC 50 switches the bus SW 56 to the ASIC 50 side (S221). Then, the BMU 73 determines whether the AC adapter 53 has been removed from the printing apparatus main body 10 (S222), and the flowchart proceeds to S223 in a case where the AC adapter 53 has been removed. Then, the CPU 58 transmits a discharge stop command for switching off the discharge SW 75 to the BMU 73 (S223). Upon receipt of the discharge stop command, the BMU 73 switches the discharge SW 75 off (S224), and cuts a supply of power from the LiB 71 to the ASIC 50. Then, the CPU 58 brings the printing apparatus into the hard-off state (S225).

As described above, in the printing apparatus PRI according to the present embodiment, in a case where a connection of the host PC 52 is detected with the AC adapter 53, which is the second external power source, not being connected, power from the battery pack 54, which is the auxiliary power source, is supplied to the printing apparatus main body 10. This enables the printing apparatus main body 10, which cannot be activated by power supplied from the host PC 52 before the enumeration processing, to be activated by the power from the battery pack 54. This can therefore ensure that the enumeration processing is performed between the host PC 52 and the printing apparatus PRI. After the enumeration processing is completed, an appropriate charge current value conforming to the battery charge specifications is set, which enables efficient USB charging of the LiB 71.

Other Embodiments

The above embodiment describes an example where the battery pack 54, which can be connected to and disconnected from the control unit (ASIC) 50 of the printing apparatus main body 10, is used as the first external power source. However, the first external power source may be one that is constantly connected to the control unit, and there is no limitation as to how the first external power source and the control unit are connected to each other.

Also, the above-described embodiment uses, as an example of an electronic device, a serial-type inkjet printing apparatus that performs printing using ink ejected from a printing head, but the present disclosure is not limited to such a case. For example, the present disclosure is also applicable to a full-line type printing apparatus that performs printing by conveying a print medium continuously and ejecting ink to the print medium from a printing head which is as long as the width of the print medium. The present disclosure may also be applicable to a printing apparatus using a printing method other than the inkjet method, such as, for example, a thermal transfer printing apparatus.

Further, the present disclosure is applicable not only to a printing apparatus, but also to other electronic devices, such as, for example, a camera or a portable scanner, and is suitable for a relatively small, portable apparatus which can be driven by power supplied from an external power source such as a battery pack.

Embodiment(s) of the disclosure can also be realized by a computer of a system or apparatus that reads out and executes computer executable instructions (e.g., one or more programs) printed on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015887 filed Jan. 31, 2020, which is hereby incorporated by reference wherein in its entirety.

What is claimed is:

1. An electric device including a battery that is capable of accumulating power a control unit that is capable of performing enumeration processing in conformity with a Universal Serial Bus (USB) standard, a first connection unit that connects with an opposite apparatus in conformity with the USB standard, and a second connection unit that connects with an AC power source, the control unit being activated by supplying power from the battery in a case where the opposite apparatus connects with the first connection unit in conformity with the USB standard, the electric device comprising:

a processing unit that performs, although the electric device is supplied with power from the AC power source in a predetermined state, the enumeration processing by the control unit which is supplied with power from the battery in the predetermined state in a case where the first connection unit connects with the opposite apparatus in conformity with the USB standard in a state where the second connection unit connects with the AC power source and the control unit is activated, wherein the predetermined state is a state where both a connection between the AC power source and the second connection unit and a connection between the opposite apparatus and the first connection unit in conformity with the USB standard are established;

an execution unit that executes, in the predetermined state, setting for a power supply in conformity with the USB standard in a case where the enumeration processing is completed in the predetermined state; and a starting unit that starts, in a case where the connection between the AC power source and the second connection unit is disconnected in the predetermined state, the power supply in conformity with the USB standard based on the setting executed before the connection between the AC supply source and the second connection unit is disconnected.

2. The electric device according to claim 1, further comprising:

a reception unit that is supplied with power from the opposite apparatus via a connection in conformity with the USB standard in a case where the opposite apparatus connects with the connection unit in conformity with the USB standard in a state where the second connection unit does not connect with the AC power source.

3. The electric device according to claim 2, wherein the control unit can be activated by power equal to or larger than a first value, in a case where the opposite apparatus connects with the first connection unit in conformity with the USB standard, power of a second value smaller than the first value can be supplied via the connection in conformity with the USB standard before the enumeration processing is completed, and power of a third value equal to or larger than the first value can be supplied via the connection in conformity with the USB standard after the enumeration processing is completed.

4. The electric device according to claim 3, wherein
in a case where a protocol used for the connection in conformity with the USB standard is Standard Downstream Port, the power of the third value is supplied via the connection in conformity with the USB standard based on a completion of the enumeration processing.

5. The electric device according to claim 3, wherein
in a case where a protocol used for the connection in conformity with the USB standard is Charging Downstream Port, the power of the third value is supplied via the connection in conformity with the USB standard irrespective of whether the enumeration processing is completed.

6. The electric device according to claim 3, wherein
in a case where a protocol used for the connection in conformity with the USB standard is Dedicated Charging Port, the power of the third value is supplied via the connection in conformity with the USB standard irrespective of whether the enumeration processing is completed.

7. The electric device according to claim 6, wherein
in a case where the protocol used for the connection in conformity with the USB standard is Dedicated Charging Port, the enumeration processing is not performed.

8. The electric device according to claim 3, wherein the setting is setting for power of the third value being supplied.

9. The electric device according to claim 2, wherein
power supplied via the connection in conformity with the USB standard is used to charge the battery.

10. The electric device according to claim 2, further comprising:
a printing unit that performs printing based on print data, wherein
power supplied via the connection in conformity with the USB standard is used to perform the printing.

11. The electric device according to claim 1, further comprising:
a communication unit that performs communication of predetermined data via a connection in conformity with the USB standard.

12. The electric device according to claim 11, wherein
the predetermined data is print data, and
printing is performed by the electric device based on the print data.

13. The electric device according to claim 1, wherein
the control unit is an Application Specific Integrated Circuit (ASIC).

14. A method of controlling an electric device including a battery that is capable of accumulating power and a control unit that is capable of performing enumeration processing in conformity with a Universal Serial Bus (USB) standard, a first connection unit that connects with an opposite apparatus in conformity with the USB standard, and a second connection unit that connects with an AC power source, the method including:
activating the control unit by supplying the control unit with power from the battery in a case where the opposite apparatus connects with the first connection unit in conformity with the USB standard; and performing, although the electric device is supplied with power from the AC power source in a predetermined state the enumeration processing by the control unit which is supplied with power from the battery in the predetermined state in a case where the first connection unit connects with the opposite apparatus in conformity with the USB standard in a state where the second connection unit connects with the AC power source and the control unit is activated, wherein the predetermined state is a state where both a connection between the AC power source and the second connection unit and a connection between the opposite apparatus and the first connection unit in conformity with the USB standard are established;

executing, in the predetermined state, setting for a power supply in conformity with the USB standard in a case where the enumeration processing is completed in the predetermined state; and starting, in a case where the connection between the AC power source and the second connection unit is disconnected in the predetermined state, the power supply in conformity with the USB standard based on the setting executed before the connection between the AC power source and the second connection unit is cut in a case where the connection between the AC power source and the second connection unit is disconnected.

15. The method according to claim 14, further comprising supplying with power from the opposite apparatus via a connection in conformity with the USB standard in a case where the opposite apparatus is connected in conformity with the USB standard.

16. The method according to claim 14, further comprising performing communication of predetermined data via a connection in conformity with the USB standard.

17. A non-transitory computer-readable storage medium storing a program to cause an electric device including a battery that is capable of accumulating power and a control unit that is capable of performing enumeration processing in conformity with a Universal Serial Bus (USB) standard, a first connection unit that connects with an opposite apparatus in conformity with the USB standard, and a second connection unit that connects with an AC power source, the control unit being activated by supplying power from the battery in a case where the opposite apparatus connects with the first connection unit in conformity with the USB standard, to operate as:
a processing unit that performs, although the electric device is supplied with power from the AC power source in a predetermined state, the enumeration processing by the control unit which is supplied with power from the battery in the predetermined state in a case where the first connection unit connects with the opposite apparatus in conformity with the USB standard in a state where the second connection unit connects with the AC power source and the control unit is activated, wherein the predetermined state is a state where both a connection between the AC power source and the second connection unit and a connection between the opposite apparatus and the first connection unit in conformity with the USB standard are established;

an execution unit that executes, in the predetermined state, setting for a power supply in conformity with the USB standard in a case where the enumeration processing is completed in the predetermined state; and a starting unit that starts, in a case where the connection between the AC power source and the second connection unit is disconnected in the predetermined state, the power supply in conformity with the USB standard based on the setting executed before the connection between the AC power source and the second connection unit is cut in a case where the connection between the AC power source and the second connection unit is disconnected.

18. The non-transitory computer-readable storage medium according to claim 17, further comprising:
a reception unit that is supplied with power from the opposite apparatus via a connection in conformity with the USB standard in a case where the opposite apparatus connects with the connection unit in conformity with the USB standard.

19. The non-transitory computer-readable storage medium according to claim 17, further comprising:
a communication unit that performs communication of predetermined data via a connection in conformity with the USB standard.

* * * * *